United States Patent
Kirkbride (10) Patent No.: US 9,586,067 B1
(45) Date of Patent: Mar. 7, 2017

(54) FIRE DETECTION AND SUPPRESSION PACK FOR BATTERY-POWERED PERSONAL COMPUTING DEVICES

(71) Applicant: The Boeing Company, Chicago, IL (US)

(72) Inventor: David W. Kirkbride, Allyn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/830,173

(22) Filed: Aug. 19, 2015

(51) Int. Cl.
| | |
|---|---|
| A62C 3/00 | (2006.01) |
| A62C 13/62 | (2006.01) |
| A62C 13/76 | (2006.01) |
| H01M 10/48 | (2006.01) |
| H01M 10/0525 | (2010.01) |

(52) U.S. Cl.
CPC .......... *A62C 3/00* (2013.01); *A62C 13/62* (2013.01); *A62C 13/76* (2013.01); *H01M 10/0525* (2013.01); *H01M 10/486* (2013.01); *H01M 2200/10* (2013.01); *H01M 2220/30* (2013.01)

(58) Field of Classification Search
CPC .... A62C 3/00; A62C 3/08; A62C 2/00; A62C 13/62; H01M 10/486; H01M 2200/10; H01M 2/127
USPC .............................. 169/6, 7, 8, 9, 47, 48, 60
See application file for complete search history.

(56) References Cited

U.S. PATENT DOCUMENTS

| | | | |
|---|---|---|---|
| 4,428,434 A * | 1/1984 | Gelaude ................... | A62C 3/00 137/624.11 |
| 5,915,480 A | 6/1999 | Yemelyanov | |
| 8,496,067 B2 * | 7/2013 | Koelewijn ............. | A62C 5/006 169/19 |
| 2011/0281520 A1 * | 11/2011 | Lin ........................ | G06F 1/1632 455/41.2 |
| 2014/0209331 A1 * | 7/2014 | Burkett ..................... | A62C 2/06 169/46 |
| 2015/0147602 A1 | 5/2015 | Bianchi et al. | |

FOREIGN PATENT DOCUMENTS

WO  2008/053254  5/2008

OTHER PUBLICATIONS

Saito et al., "Fire Extinguishing Effect of Mixed Agents of Halon 1301 and Inert Gases," Fire Safety Science—Proc. Fifth Int'l Symp. (1997), pp. 901-910.

* cited by examiner

*Primary Examiner* — Arthur O Hall
*Assistant Examiner* — Viet Le
(74) *Attorney, Agent, or Firm* — Ostrager Chong Flaherty & Broitman P.C.

(57) ABSTRACT

Systems and methods for mitigating the risk of and/or suppressing fires caused by lithium battery-powered personal computing devices used on the flight deck or in crew and passenger compartments onboard an aircraft. A fire detection and suppression pack is attached to a lithium-ion battery-powered portable personal computing device. The fire detection and suppression pack has a weight and volume consistent with and does not impair the use of the portable personal computing device. The fire detection and suppression pack is a full-time fire suppression system that is on hot standby at all times, independent of the computing device's power mode. The fire detection and suppression pack uses gases stored in canisters to provide cool-down, displacement suppressant to control and extinguish any fire source and associated burnable fuel required to sustain the fire event.

22 Claims, 7 Drawing Sheets

FIRE DETECTION AND SUPPRESSION PACK FOR BATTERY-POWERED PERSONAL COMPUTING DEVICES

BACKGROUND

This disclosure is generally related to systems and methods for suppressing fires in battery-powered personal use devices. In particular, this disclosure relates to portable personal computing devices powered by lithium-ion batteries.

A lithium-ion battery is a member of a family of rechargeable battery types in which lithium ions move from an anode to a cathode during discharge and from the cathode to the anode when charging. Lithium-ion batteries are common in many consumer electronics as they are one of the most popular types of rechargeable batteries for personal computing devices.

Despite the positive attributes of lithium-ion batteries, there have been concerns associated with their use. Lithium-ion batteries are capable of spontaneous ignition and subsequent explosion due to overheating. Overheating may be caused by electrical shorting, rapid discharge, overcharging, manufacturer's defect, poor design, or mechanical damage, among many other causes. Overheating results in a process called thermal runaway, which is a reaction within the battery causing internal temperature and pressure to rise at a quicker rate then can be dissipated. Because many airlines are replacing paper charts with laptops and tablet computers, any risks associated with the use of lithium-ion batteries onboard aircraft should be mitigated to the greatest extent possible.

SUMMARY

The subject matter disclosed herein is directed to systems and methods for mitigating the risk of and/or suppressing fires caused by lithium battery-powered portable personal computing devices and similar devices used or carried on the flight deck or in crew and passenger compartments onboard an aircraft. In accordance with some embodiments, an accessory unit (referred to herein as a "fire detection and suppression pack") is attached to a lithium-ion battery-powered portable personal computing device. The fire detection and suppression pack has a weight and volume consistent with the portable personal computing device and does not impair the use of the portable personal computing device. The fire detection and suppression pack is a full-time fire suppression system that is on hot standby at all times, independent of the computing device's power mode (i.e., on or off). The fire detection and suppression pack uses gases (stored in canisters) to cool down hot elements, deplete oxygen content, provide chemical flame extinguishing of an existing flame, and inhibit reignition. The fire detection and suppression pack provides a user-friendly, lightweight, cost-effective means to match the preferred fire fighting response to lithium-ion battery-powered devices and systems.

In preferred embodiments, the total system integrates two redundant suppression systems, each having a pressurized suppressant cartridge and associated flow control valves and plumbing. This redundancy allows the use of a single gas suppressant in both cartridges, either Halon 1301 or $CO_2$ or the use of a mixed gas suppressant methodology, one cartridge with $CO_2$ to enhance cool-down effects and Halon 1301 to provide chemical flame extinguishing. The mixed gas suppression methodology provides greater fire suppression than does either the Halon 1301 or the $CO_2$ alone. Both suppressants are considered clean agents and leave no harmful residues after their use. This is a major advantage over the use of some alternative suppressant that requires clean up after its use. This has the advantage of allowing a higher error rate in premature release of suppression, which allows a quicker response time to be employed The fire detection and suppression pack can be constructed in an open box-like configuration that physically and functionally interfaces with the lithium ion battery-powered personal computing device. In some embodiments, the fire detection and suppression pack serves as a cold dock on which a personal computing device can be seated. The interface surface of the fire detection and suppression pack that faces the battery-powered personal computing device may consist of an array of surface nozzles that direct suppressant gas flow onto a surface of the personal computing device to cool it and provide a cold gas firewall at the interface. The cold gas suppressant flow is initiated when a suppressant discharge control processor detects fire event conditions and releases the suppressant stored in cartridges located in fire detection and suppression pack. Some of the released suppressant floods into the interior volume of the battery-powered personal computing device to cool down hot elements, deplete oxygen content, provide chemical flame extinguishing of an existing flame and inhibit reignition. The volume flooding can be accomplished at the interface volume between the fire detection and suppression pack and the battery-powered personal computing device using existing cooling flow porting in the latter as well as suppressant flow through a USB bridge assembly interface which directs additional flooding suppressant flow into the interior volume of the personal computing device.

In accordance with some embodiments, the suppressant discharge control processor processes temperature signals taken from the personal computing device's health monitoring BIOS and/or temperature signals taken by the fire detection and suppression pack itself. When these temperatures reach limits set to indicate a fire event, the control processor sends a suppressant discharge activation signal to a suppressant flow control system which releases, directs and cycles the suppressant flow to the interfaces between the lithium ion battery-powered personal computing device and the fire detection and suppression pack.

One aspect of the subject matter disclosed in detail below is a fire detection and suppression pack comprising: a support structure configured to support a battery-powered personal computing device with an interface volume therebetween; a source of suppressant; a suppressant regulation and distribution system connected to the source of suppressant; and a control processor configured to issue an activation signal to the suppressant regulation and distribution system when a temperature inside or outside the battery-powered personal computing device equals or exceeds a first limit set to indicate a fire event, wherein the suppressant regulation and distribution system is configured to release and direct a flow of suppressant from the source of suppressant to the interface volume between the battery-powered personal computing device and the fire detection and suppression pack in response to receipt of the activation signal. In accordance with some embodiments, the suppressant regulation and distribution system comprises: a suppressant flow control module that is configured to release suppressant from the source of suppressant in response to receipt of the activation signal; an expansion bladder having a port and a plurality of nozzles; and tubing connecting the suppressant flow control module to the port of the expansion bladder, wherein the nozzles are disposed in a portion of the expansion bladder that partly defines the interface volume. The suppressant may comprise an inert gas or an organic halide gas or a mixture thereof.

In accordance with a further aspect of the fire detection and suppression pack described in the preceding paragraph, the control processor may be further configured to issue an activation signal to the suppressant regulation and distribution system when a temperature inside or outside the battery-powered personal computing device equals or exceeds a second limit which is lower than the first limit and a rate of temperature increase equals or exceeds a third limit.

Another aspect of the subject matter disclosed in detail below is an assembly comprising a personal computing device and a fire detection and suppression pack attached to the personal computing device, wherein the personal computing device comprises a case, at least one battery and at least one temperature sensor, and wherein the fire detection and suppression pack comprises: a source of suppressant; a control processor connected to receive electrical signals representing temperatures from the at least one temperature sensor and configured to issue an activation signal when a temperature inside the personal computing device equals or exceeds a limit set to indicate a fire event, and a suppressant regulation and distribution system connected to the source of suppressant, wherein the suppressant regulation and distribution system is configured to release suppressant from the source of suppressant and direct a flow of suppressant toward the personal computing device in response to receipt of the activation signal from the control processor. In accordance with some embodiments, the suppressant regulation and distribution system comprises: a suppressant flow control module that is configured to release suppressant from the source of suppressant in response to receipt of the activation signal; an expansion bladder having a port and a plurality of nozzles; and tubing connecting the suppressant flow control module to the port of the expansion bladder, wherein the nozzles are disposed in a portion of the expansion bladder that partly defines the interface volume. The expansion bladder may be arranged so that suppressant flowing out through the plurality of nozzles will impinge upon a case of the at least one battery or a portion of the case of the personal computing device which is adjacent to the at least one battery.

In accordance with one embodiment, the case of the personal computing device has an interior volume and first and second ports that are in fluid communication with that interior volume; the control processor comprises a microprocessor; the suppressant regulation and distribution system comprises a switch and tubing connecting the source of suppressant to the first port of the case to enable flow of suppressant from the source of suppressant into the interior volume of the case in response to the switching receiving the activation signal; and the assembly further comprises an electrical plug inserted in the second port and an electrical cable connecting the microprocessor to the switch, at least a portion of the electrical cable being disposed inside a corresponding portion of the tubing. In some cases, the first and second ports are respective USB receptacles.

In accordance with some embodiments of the assembly, the fire detection and suppression pack further comprises a case having a first attachment device attached thereto and a flexible sleeve having one edge attached to the case of the fire detection and suppression pack and having a second attachment device attached to another edge thereof, the flexible sheet being configured so that the second attachment device can be attached to the first attachment device when a portion of the personal computing device is disposed between the flexible sleeve and the case of the fire detection and suppression pack.

A further aspect of the subject matter disclosed in detail below is an assembly comprising a personal computing device and a dock that supports the personal computing device, wherein the personal computing device comprises a battery and at least one temperature sensor, and wherein the dock comprises: a source of suppressant; an electronic valve connected to the source of suppressant; an expansion bladder having a port and a plurality of nozzles; tubing connecting the electronic valve to the port of the expansion bladder; and a control processor connected to receive electrical signals representing temperatures from the at least one temperature sensor and configured to issue an activation signal when a temperature inside the personal computing device equals or exceeds a limit set to indicate a fire event, wherein the electronic valve opens to allow suppressant to flow from the source of suppressant into the expansion bladder in response to receipt of the activation signal from the control processor. In some embodiment, the battery comprises a case and the expansion bladder is arranged so that suppressant flowing out through the plurality of nozzles will impinge upon the case of the battery.

Yet another aspect of the subject matter disclosed in detail below is a method for mitigating fire risk during operation of a battery-powered personal computing device onboard an aircraft, comprising: (a) placing a fire detection and suppression pack including a container containing suppressant onboard the aircraft; (b) establishing a closed physical connection between the container and the battery-powered personal computing device, which physical connection is configured to provide a flow path for fluid when a state of the physical connection is changed from closed to open; and (c) monitoring a temperature inside the battery-powered personal computing device to determine whether a temperature inside the battery-powered personal computing device is above or below a specified threshold. If a fire event occurs, the method may further comprise opening the physical connection in response to a determination in step (c) that a temperature inside the battery-powered personal computing device is above the specified threshold. This method may further comprise one or both of the following: (a) forming jets of suppressant that impinge on a battery case of the personal computing device; and/or (b) directing suppressant through a USB receptacle and into the volume of space inside the case of the personal computing device.

Other aspects of systems and methods for preventing or suppressing fires caused by lithium battery-powered personal computing devices are disclosed below.

BRIEF DESCRIPTION OF THE DRAWINGS

FIG. 6 is a diagram representing a top view of a fire detection and suppression pack having four expansion bladders with impingement flow nozzles. The bold dash-dot lines indicate the location of the lithium ion battery pack. FIG. 6 also shows the configuration of a bladder manifold in accordance with one embodiment.

Reference will hereinafter be made to the drawings in which similar elements in different drawings bear the same reference numerals.

DETAILED DESCRIPTION

Various embodiments of systems and methods for detecting and suppressing fires in portable personal computing devices will now be described in detail for the purpose of illustration. At least some of the details disclosed below relate to optional features or aspects, which in some applications may be omitted without departing from the scope of the claims appended hereto.

Figure 1:
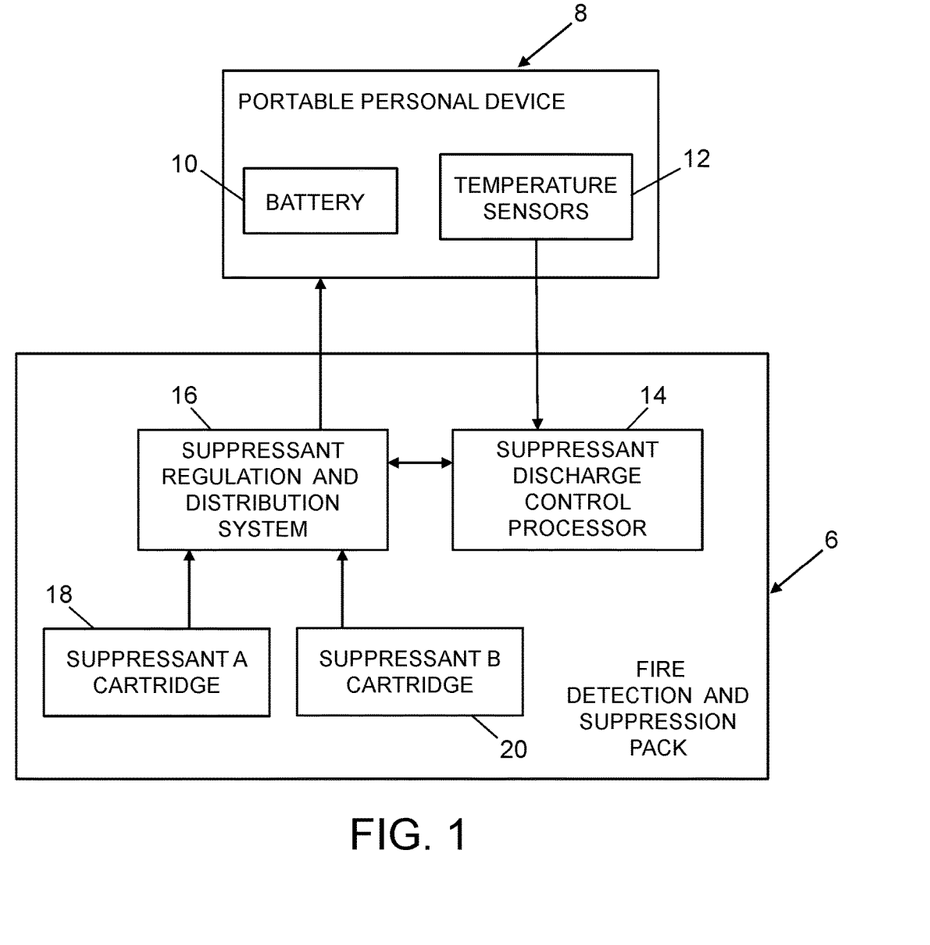
FIG. 1 is a block diagram identifying some components of a system for detecting and suppressing a fire in a portable personal computing device in accordance with various embodiments.

FIG. 1 is a block diagram identifying some components of a system for detecting and suppressing a fire in a battery-powered personal computing device 8. In accordance with various embodiments, the personal computing device 8 comprises a lithium ion battery 10. The temperatures inside the personal computing device 8 are detected using temperature sensors 12 (e.g., thermistors). The detection/suppression system may take the form of a fire detection and suppression pack 6 which is attached to the personal computing device 8. The fire detection and suppression pack 6 is configured to support the particular battery-powered personal computing device with an interface volume therebetween.

In accordance with some embodiments, the fire detection and suppression pack 6 comprises a cartridge 18 containing a suppressant A, a cartridge 20 containing a suppressant B, a suppressant regulation and distribution system 16 connected to cartridges 18 and 20, and a suppressant discharge control processor 14 connected to receive electrical signals representing temperatures inside the battery-powered personal computing device from the temperature sensors 12. In accordance with other embodiments, the fire detection and suppression pack 6 may have only a single suppressant cartridge or more than two suppressant cartridges.

The suppressant discharge control processor 14 is configured (i.e., programmed) to issue an activation signal to the suppressant regulation and distribution system 16 when a temperature inside the battery-powered personal computing device 8 equals or exceeds a limit set to indicate a fire event. The suppressant regulation and distribution system 16 is configured to discharge and direct a flow of mixed suppressant gases from the cartridges 18 and 20 to an interface volume between the battery-powered personal computing device 8 and the fire detection and suppression pack 6 in response to receipt of the activation signal from the suppressant discharge control processor 14. More specifically, a mixture of suppressant gases may be injected into an interior volume of the case of the personal computing device and/or directed to impinge upon a case of the lithium ion battery 10, as will be described in more detail below with reference to FIGS. 4 and 5B. In accordance with one embodiment, suppressant A is an inert gas (e.g., carbon dioxide) and suppressant B is an organic halide gas (e.g., Halon 1301).

As will be described in detail below, in accordance with some embodiments, the suppressant regulation and distribution system 16 comprises: (a) a suppressant flow control module that responds to the activation signal by discharging suppressant gas; (b) one or more expansion bladders each having an array of nozzles that direct some of the suppressant gas discharged by the suppressant flow control module onto an exterior surface of and/or through venting ports into the interior volume of the battery-powered personal computing device 8; and (c) a flow channel that directs some of the suppressant gas discharged by the suppressant flow control module through a USB or other receptacle and into the interior volume of the battery-powered personal computing device 8.

Figure 2:
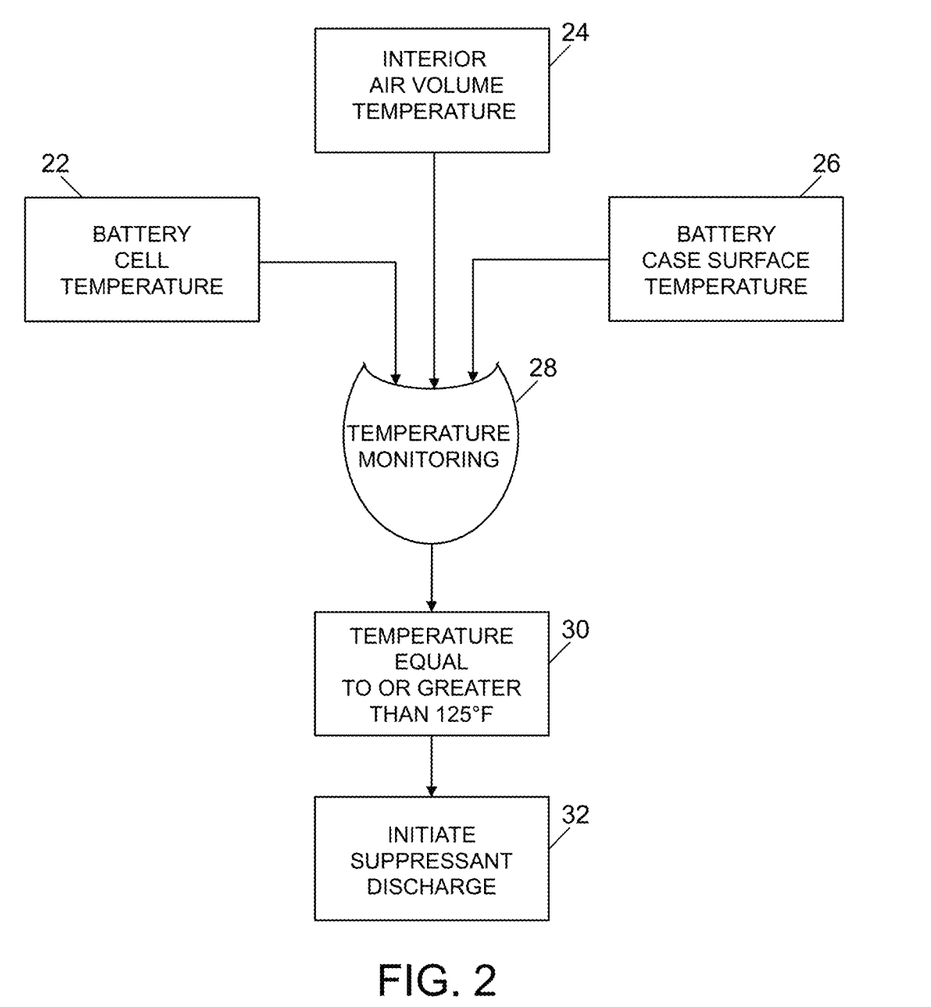
FIG. 2 is a flowchart identifying steps of a method for detecting and suppressing a fire in a portable personal computing device in accordance with one embodiment.

FIG. 2 is a flowchart identifying steps of a method for detecting and suppressing a fire in a portable personal computing device in accordance with one embodiment. The temperature sensors 12 inside the portable personal computing device 8 detect the battery cell temperature 22, the interior air volume temperature 24, and the battery case surface temperature 26. These temperatures are input to the suppressant discharge control processor 14 that performs temperature monitoring (step 28). In accordance with the embodiment depicted in FIG. 2, a determination is made whether the interior air volume temperature 24 is equal to or greater than a specified threshold (step 30), e.g., 125° F. The thresholds for the battery cell temperature 22 and the battery case surface temperature 26 will be set higher. If at least one of the battery cell temperature 22, the interior air volume temperature 24, and the battery case surface temperature 26 equals or exceeds a respective specified threshold, then suppressant discharge is initiated (step 32).

In alternative implementations, suppressant discharge can be initiated when one of the monitored temperatures equals or exceeds a first specified threshold or when the same monitored temperature equals or exceeds a second specified threshold (less then the first specified threshold) and the rate of temperature increase equals or exceeds a third specified threshold. For example, the suppressant discharge control processor 14 may be configured to issue an activation signal when the ambient interior air temperature inside the personal computing device equals or exceeds a first limit (e.g., $T_A \geq 60°$ C.) or when the ambient interior air temperature equals or exceeds a second limit which is lower than the first limit (e.g., $T_A \geq 45°$ C.) and the rate of temperature increase equals or exceeds a third limit (e.g., $dT_A/dt \geq +3°$ C./sec).

In some embodiments, the system uses two independent temperature sensing systems: temperature sensors incorporated in the personal computing device's internal system (e.g., the basic input/output system, BIOS, which comprises firmware) and contact temperature sensors on the surface of the fire detection and suppression pack 6. The suppressant discharge control processor 14 compares the temperature inputs against preset limits. A continuous voting process is used to initiate suppressant discharge by the suppressant flow control module (part of the suppressant regulation and distribution system 16) when one or more limits are exceeded.

The baseline fire detection and suppression apparatus, associated methodologies, principles and hardware can be applied across the market spectrum of lithium ion battery-powered personal computing devices and systems. The case of the fire detection and suppression pack 6 can be custom configured to accommodate the differences in form factors, dimensions, battery pack locations between different manufacturers and between different models from the same manufacturer.

Figure 3A:
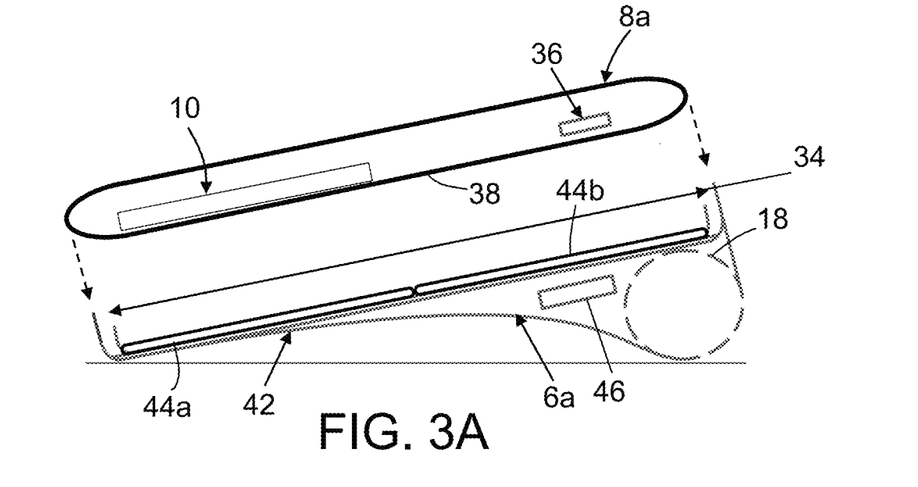
FIG. 3A is a diagram showing a closed clam-shell tablet computer being lowered toward a fire detection and suppression pack.
Figure 3B:
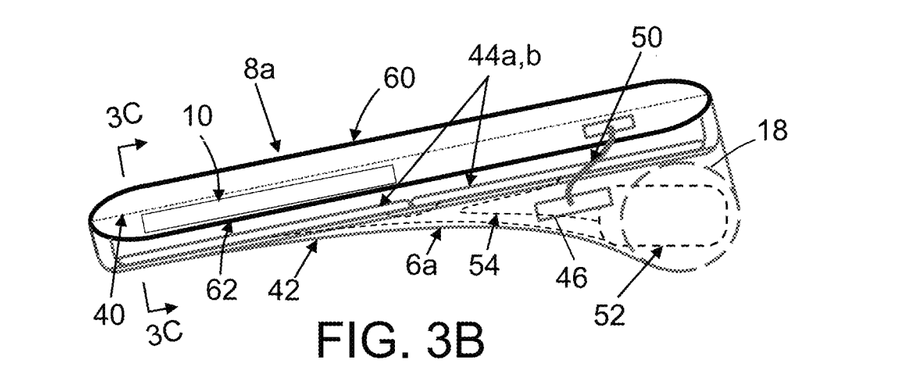
FIG. 3B is a diagram showing a fire detection and suppression pack attached to a tablet computer by means of a flexible plastic sleeve that lies between the respective halves of the table computer and is attached in two places to the case of the fire detection and suppression pack.

FIG. 3A is a diagram showing a closed clam-shell tablet computer 8a being lowered toward a fire detection and suppression pack 6a. An interface volume 34 between the tablet computer case 38 and the cold dock case is indicated by a double-headed arrow in FIG. 3A. FIG. 3B shows fire detection and suppression pack 6a attached to tablet computer 8a. When the tablet computer 8a is attached to the fire detection and suppression pack 6a, they form an integrated stand-alone fire detection and suppression system.

As best seen in FIG. 3B, the tablet computer 8a is powered by a lithium ion battery 10. The tablet computer 8a comprises a computer case 38 having at least one USB receptacle 36. The fire detection and suppression pack 6a comprises a cold dock case 42, two suppressant cartridges (only the suppressant A cartridge is visible), a suppressant flow control module 52, and four expansion bladders (only expansion bladders 44a and 44b are visible). The cold dock case 42 has a USB receptacle 46. In this particular embodiment, attachment consists of securing the cold dock case 42 to the keyboard half 62 of the tablet computer 8a and plugging a USB bridge assembly 50 into the USB receptacles 46 and 50.

Figure 3C:
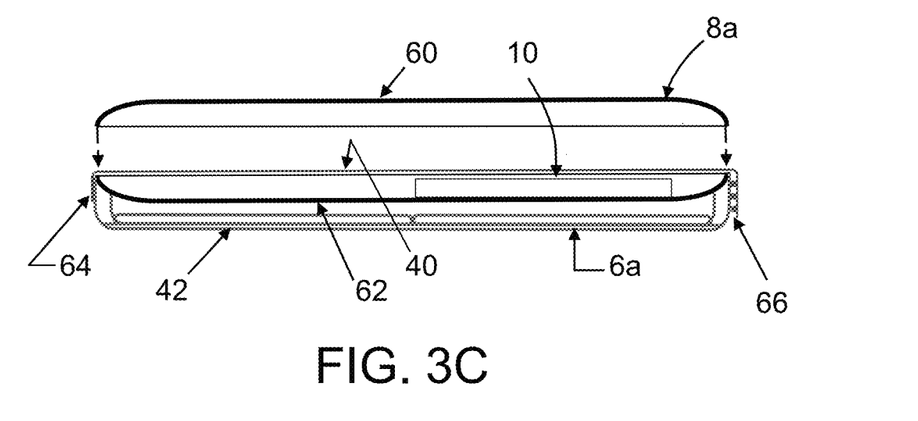
FIG. 3C is a diagram representing a front view (as indicated by arrows 3C in FIG. 3B) of the flexible plastic sleeve draped across the lower half of the tablet computer when the other half, i.e., the display panel, of the tablet computer is raised.

The fire detection and suppression pack 6a is attached to the tablet computer 8a by means of a flexible plastic sleeve 40 (indicated by a straight dashed line) that lies between the display half 60 and the keyboard half 62 of the tablet computer 8a. As best seen in FIG. 3C, the flexible plastic sleeve 40 is attached in two places to the cold dock case 42 and draped across the keyboard half 62 of the tablet computer 8a of the tablet computer when the display half 60 of the tablet computer 8a is raised and separated from keyboard half 62. A first marginal portion of the flexible plastic sleeve 40 is attached to one side of the cold dock case 42 by means of a bonded joint 64; a second marginal portion of the flexible plastic sleeve 40 has a strip of hook-and-loop fastener fabric attached thereto, which strip can be attached to another strip of hook-and-loop fastener fabric which is bonded to the other side of the cold dock case 42 to form a hook-and-loop fastener closure 66 that allows for selective tensioning of the flexible plastic sleeve 40. The tensioned flexible plastic sleeve 40 retains the tablet computer 8a on the fire detection and suppression pack 6a.

The flexible plastic sleeve 40 may take the form of a thin elastic ultra-high-molecular-weight polyethylene sleeve customized to fit the specific make and model of personal computing device that the fire detection and suppression pack cold dock is being used on. This sleeve allows for touch screen applications or may have key pad cutouts as well as other cutouts to accommodate switches, USB ports and other features.

Figure 4:
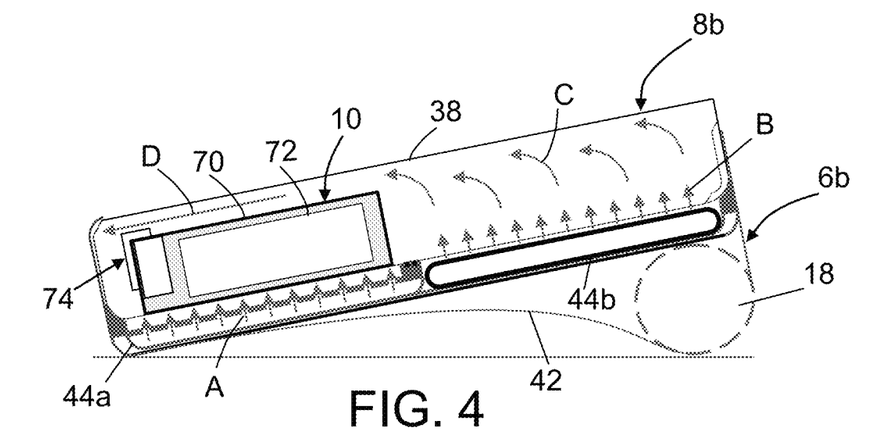
FIG. 4 is a diagram representing a sectional view of a fire detection and suppression pack attached to a laptop computer in accordance with other embodiments.

FIG. 4 is a diagram representing a sectional view of a fire detection and suppression pack 6b attached to a laptop computer 8b powered by a lithium ion battery 10. The lithium ion battery comprises a lithium ion battery cell 72 housed in a battery case 70. The lithium ion battery 10 powers the electrical components of the laptop computer 8b via a battery circuit/connector 74. The fire detection and suppression pack 6a comprises a cold dock case 42, two suppressant cartridges (only the suppressant A cartridge is visible), a suppressant flow control module (not shown in FIG. 4), and four expansion bladders (only expansion bladders 44a and 44b are visible).

In FIG. 4, the fire detection and suppression pack 6a is shown in a state immediately following initiation of suppressant discharge. The discharge of pressurized suppressant causes the expansion bladders to inflate. The expansion bladders have nozzles that dilate (i.e., open) as the bladder expands. The expansion bladders and nozzles may be made of nylon or any other suitable high-temperature elastic material (e.g., possibly polyurethane).

In the example depicted in FIG. 4, expansion bladder 44a is disposed underneath the lithium ion battery 10. As seen in FIG. 4, when expansion bladder 44a is expanded, jets of suppressant gas (as indicated by parallel arrows A) exiting the bladder will impinge directly on the portion of the computer case 38 that is adjacent to and in contact with the battery case 70, thereby cooling the lithium ion battery 10 and suppressing any fire condition. When expansion bladder 44b is expanded, jets of suppressant gas (as indicated by parallel arrows B) will enter the interior volume of the laptop computer 8b via cooling system vents built into the computer case 38. (Laptops and tablets have various cooling schemes and cooling flow inlets and outlets.) This flow of suppressant gas will circulate (as indicated by curved arrows C and straight arrow D) inside the tablet computer 8a, thereby providing additional cooling and fire suppression for the lithium ion battery 10.

Figure 5A:
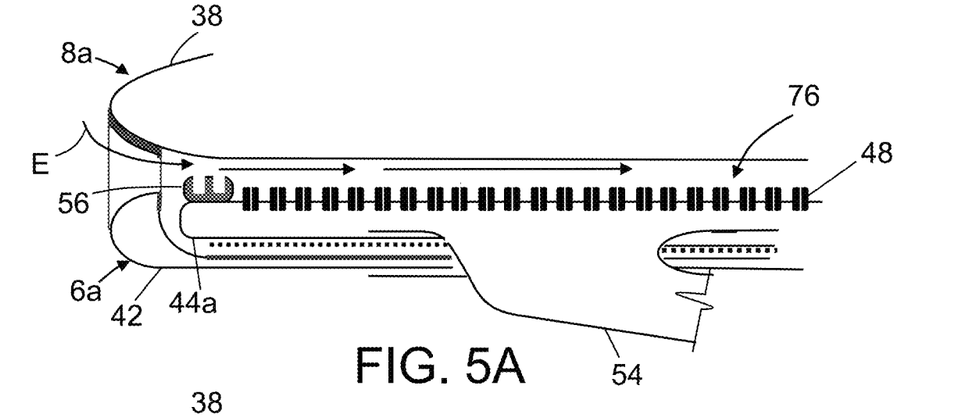
FIGS. 5A and 5B are diagrams representing respective sectional views of respective portions of a fire detection and suppression pack and a tablet computer in accordance with some embodiments. The fire detection and suppression pack is shown in two different states: before initiation of impingement flow of suppressant gas on a surface of the notebook computer (FIG. 5A) and after initiation of such impingement flow.
Figure 5B:
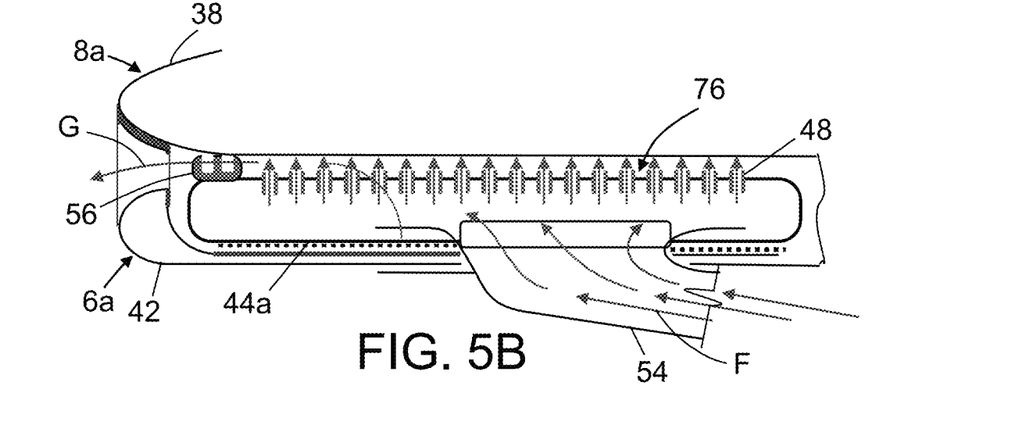

FIGS. 5A and 5B are diagrams representing respective sectional views of respective portions of a fire detection and suppression pack 6a and a tablet computer 8a in accordance with some embodiments. The fire detection and suppression pack 6a is shown in two different states: before initiation of impingement flow of suppressant gas on a bottom surface of the computer case 38 (FIG. 5A) and after initiation of such impingement flow (FIG. 5B).

As depicted in FIG. 5A, during normal operation (i.e., when temperatures inside the tablet computer 6a are below the suppressant discharge temperature), ambient air can flow (as indicated by arrows E) into and through an interface volume 76 formed by the confronting surfaces of the fire detection and suppression pack 6a and tablet computer 8a. The circulating ambient air provides cooling. In the state depicted in FIG. 5A, the labyrinth seal 56 is retracted, the impingement flow nozzles 48 are constricted, and the expansion bladder 44a is in a collapsed state.

In contrast, when suppression discharge is initiated (i.e., when temperatures inside the tablet computer 6a are equal to or above the suppressant discharge temperature), discharged suppressant gas will flow via an expansion bladder into and then out of the interface volume 76 (as indicated by arrows G in FIG. 5B). Flooding of the interface volume 76 between the fire detection and suppression pack 6b and tablet computer 8a is accomplished using the expansion bladders (e.g., expansion bladder 44a). In the state depicted in FIG. 5B, the labyrinth seal 56 is extended, the impingement flow nozzles 48 are dilated, and the bladder 44a is expanded by the suppressant gas pressure prior to exiting the impingement flow nozzles 48. The expansion bladder 44a is inflated by the pressurized suppressant gas flowing through the bladder manifold 54, one end of which is connected to a port of the expansion bladder 44a and the other end of which is in fluid communication with the suppressant flow control module (not shown in FIGS. 5A and 5B).

The labyrinth seal 56 on the perimeter of each bladder maintains a positive pressure in the interface volume 76, which forces suppressant flow through and out of the interface volume 76. In the case of an expansion bladder disposed under cooling system vents in the computer case 38, the labyrinth seal 56 will maintain a positive pressure which forces suppressant flow into the interior volume of the tablet computer 8a through those cooling system vents.

The pressurized discharged suppressant flow entering the expansion bladders expands them against the bottom surface of the case of the personal computing device. The dimensions of perimeter labyrinth seals 56 establishes the impingement cooling jet offset from the bottom surface of the computer case 38. The perimeter labyrinth seals 56 also maintain a positive pressure in the flooded interface volume 76 between the expansion bladders and the personal computing device. This positive pressure forces flooding flow into the interior volume of the personal computing device through its ambient air cooling paths. Volume flooding of the interface volume 76 and the interior volume of the personal computing device cools hot surfaces, prevents sparking, and extinguishes any flame sources that may ignite or reignite a fire in the personal computing device.

Figure 6:
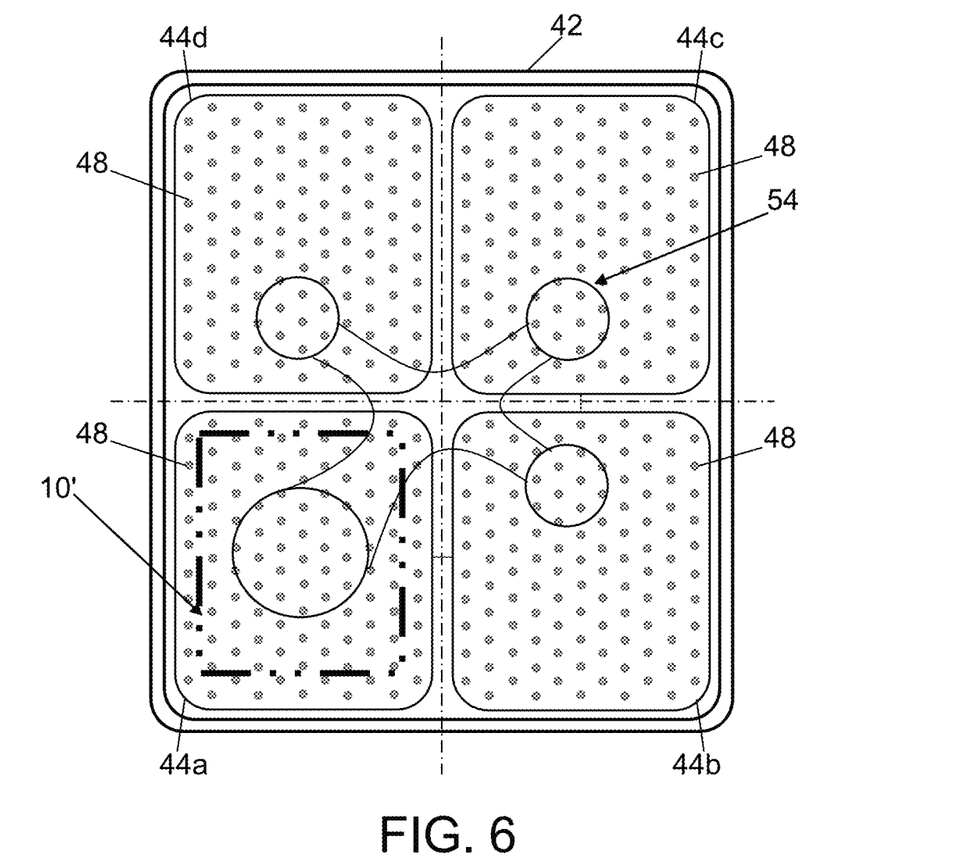

FIG. 6 is a diagram representing a top view of a fire detection and suppression pack having four expansion bladders 44a-44d disposed in four quadrants of the pack. Each expansion bladder 44a-44d comprises a respective array of impingement flow nozzles 48 disposed on the side of the bladder that faces the personal computing device. The bold dash-dot lines indicate the location 10' of a lithium ion battery pack inside the personal computing device. FIG. 6 also shows one configuration of a bladder manifold 54 which is biased to concentrate the cooling flow of suppressant toward the battery pack. Preferably, the expansion bladders direct high-density jetted cooling flow that impinges on the bottom surface of the computer case 38 adjacent to the location 10' of the lithium ion battery pack, with less dense jetted flow on other portions of the bottom surface.

Figure 7:
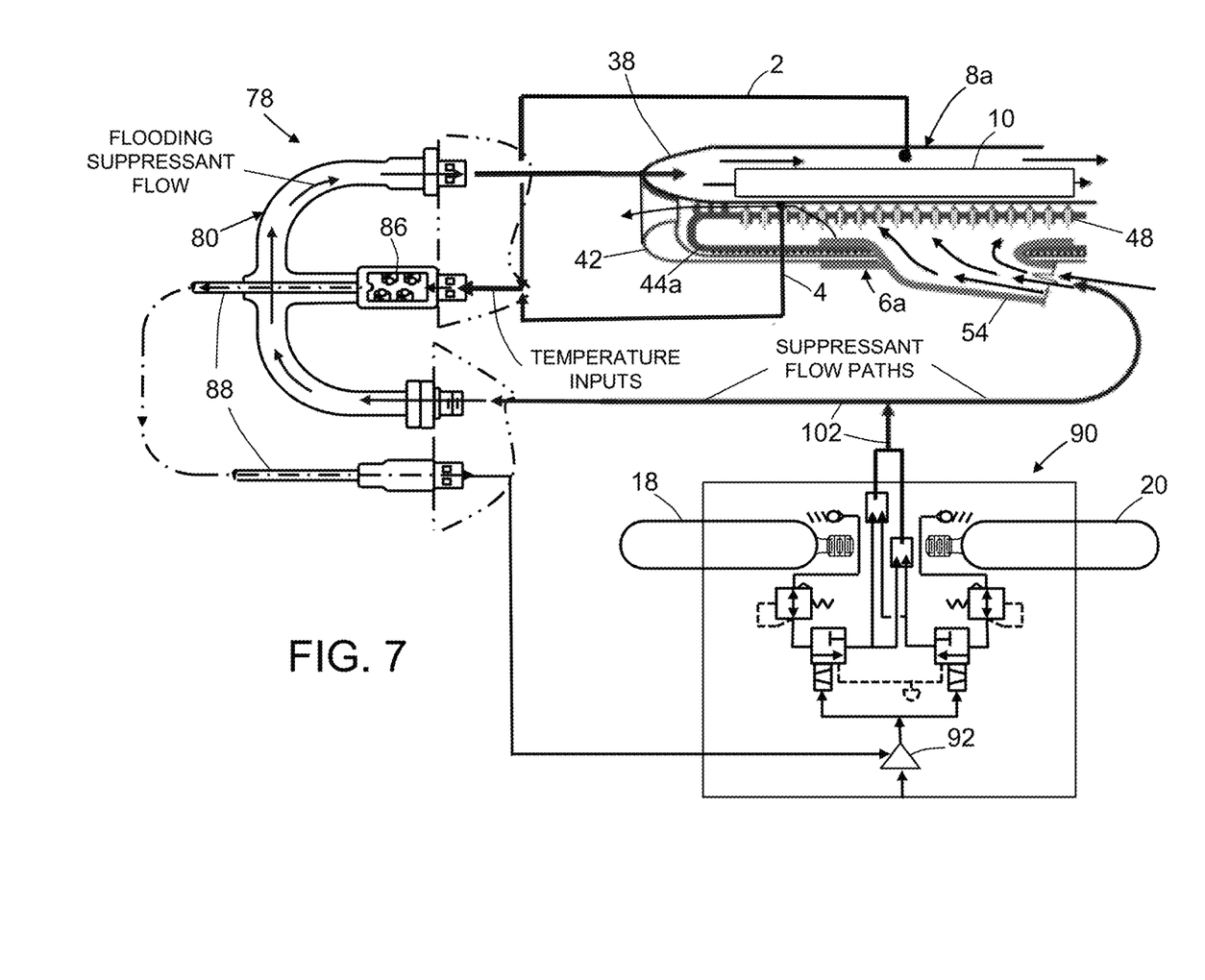
FIG. 7 is a hybrid diagram comprising a sectional view of a portion of a fire detection and suppression pack (of the type partially depicted in FIG. 5B) attached to a tablet computer, a plan view of a USB bridge assembly, and a flow path diagram representing some components of the suppressant flow control module. Preferably the suppressant flow control module is inside the case of the fire detection and suppression pack, while the USB bridge assembly connects the cases of the tablet computer and fire detection and suppression pack.

FIG. 7 is a hybrid diagram comprising a sectional view of a portion of a fire detection and suppression pack (of the type partially depicted in FIG. 5B) attached to a tablet computer 8a, a plan view of a USB bridge assembly 78, and a flow path diagram representing other components of the suppressant regulation and distribution system 16 depicted in FIG. 1, including a suppressant flow control module 90 and a gas flow manifold 102. Preferably the suppressant flow control module 90 is disposed inside the cold dock case 42, The USB bridge assembly 78 comprises a pitchfork-shaped bridge 80 that forms a conduit for suppressant flow that may be considered part of the suppressant regulation and distribution system 16. The USB bridge assembly 78 connects to the computer case 38 of the tablet computer 8 and to the cold dock case 42; and is designed to convey electrical signals from the tablet computer 8 to the suppressant flow control module 90 and convey suppressant gas from the suppressant flow control module 90 to the tablet computer 8.

Still referring to FIG. 7, the USB bridge assembly 78 comprises a suppressant discharge control microprocessor 86 which receives temperature inputs 2 from the tablet computer's internal system and temperature inputs 4 from contact temperature sensors attached to the surface of the cold dock case 42. The suppressant discharge control microprocessor 86 monitors and processes the temperature inputs, and outputs flow control command signals to the suppressant flow control system 90. In accordance with some embodiments, the suppressant discharge control microprocessor 86 compares the received temperatures and their rate of change to respective preset (i.e., specified) temperature and rate of change limits. When one or more of these limits are exceeded, a voting algorithm determines whether the suppressant should be discharged or not. A Yes vote outcome results in an open command signal being transmitted to the suppressant flow control system 90.

Figure 7A:
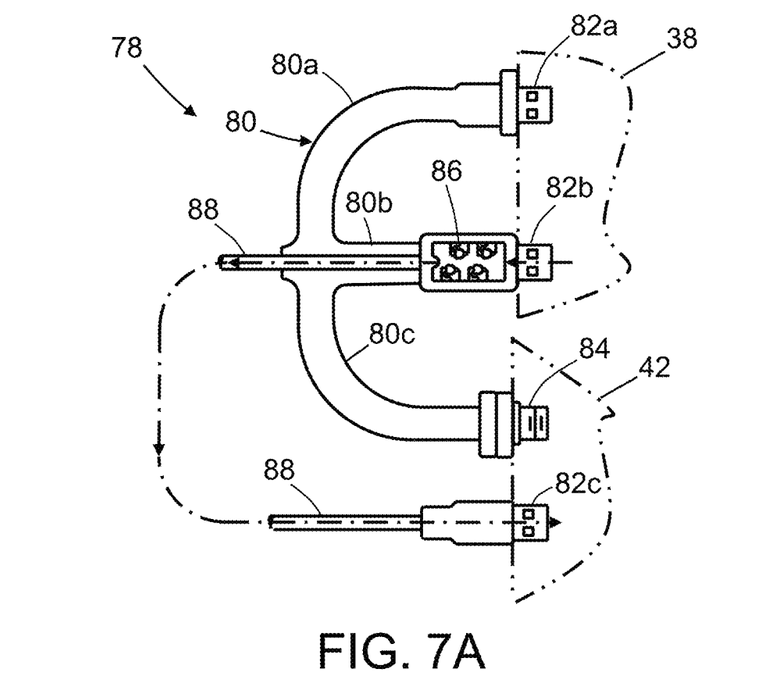
FIG. 7A is a diagram showing the plan view of the suppressant flow control module seen in FIG. 7 on a magnified scale.

FIG. 7A represents a plan view of USB bridge assembly 78 in accordance with one embodiment. The bridge 80 comprises three conduits 80a, 80b, and 80c that intersect at a common junction. The conduits are preferably fabricated from plastic, rubber or composite materials. The distal end of conduit 80a is connected to a USB plug 82a that is fittable into a first USB receptacle integrated into the computer case 38 (partly indicated by dash-dot lines). The distal end of conduit 80c is connected to a flow connector 84 that is coupled to the cold dock case 42 (partly indicated by dash-dot lines). Since the conduits 80a and 80c are in fluid communication, suppressant gas discharged by the suppressant flow control module 90 (see FIG. 7) can flow through a gas flow manifold 102, flow connector 84, conduits 80c and 80a, and USB plug 82a, and into the interior volume of the computer case 38 by way of the aforementioned first USB receptacle in the computer case 38.

Still referring to FIG. 7A, the distal end of the middle conduit 80b is connected to a USB plug 82b that is fittable into a second USB receptacle integrated into the computer case 38. In accordance with this embodiment, the suppressant discharge control microprocessor 86 is seated in the middle conduit 80b. As previously mentioned, the suppressant discharge control microprocessor 86 receives, monitors and processes the temperature inputs from the temperature sensors 12 (see FIG. 1). The suppressant discharge control microprocessor 86 is electrically connected to a USB plug 82c by means of an electrical cable 88. The portion of electrical cable 88 closest to the suppressant discharge control microprocessor 86 is disposed inside the middle conduit 80b. The remainder of electrical cable 88 passes through a wall of the bridge 80 and terminates at a USB plug 82c, which is fittable into a USB receptacle integrated into the cold dock case 42. In response to a fire event, the suppressant discharge control microprocessor 86 sends an activation signal via electrical cable 88 and USB plug 82c to the suppressant flow control module 90 (see FIG. 7). This activation signal initiates the discharge of suppressant by the suppressant flow control module 90.

Figure 7B:
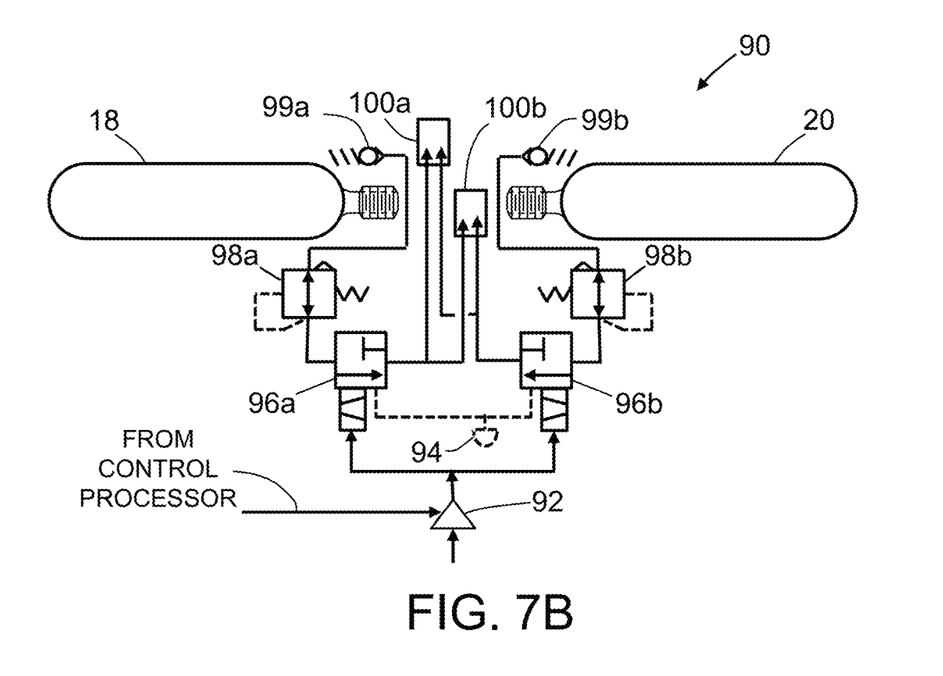
FIG. 7B is a diagram showing the plan view of the USB bridge assembly seen in FIG. 7 on a magnified scale.

FIG. 7B represents a plan view of the suppressant flow control module 90 on a magnified scale. The suppressant flow control module 90 consists of the hardware used to control and condition the pressurized suppressant discharge flow. It is a dual redundant system with two subsystems: one subsystem controls the flow of suppressant A from pressurized cartridge 18 and the other subsystem controls the flow of suppressant B from pressurized cartridge 20. Both subsystems are configured and sized as stand-alone systems capable of suppressing a lithium-ion battery-powered personal computing device/system fire event. Combined they provide the added benefit of a mixed gas suppressant system. In accordance with some embodiments, suppressant A is carbon dioxide and suppressant B is Halon 1301. Both carbon dioxide and Halon 1301 are considered clean agents and when mixed, provide a multiplier effect in there fire-suppression capabilities. The use of cartridge-stored suppressant allows the use of alternate suppressants to match the future use of advanced power storage technologies.

As depicted in FIG. 7B, the activation signal is received by a suppressant discharge micro-switch 92, which is part of the suppressant flow control module 90. The suppressant discharge micro-switch 92 is normally Off. In response to the activation signal, the suppressant discharge micro-switch 92 provides electrical power to a pair of solenoid on-off valves 96a, 96b. Each subsystem is triggered by when a respective solenoid on-off valve 96a, 96b changes state from off to on. A respective in-line pressure regulator 98a, 98b reduces the system pressure from the storage gas pressure to the design working pressure. Respective mixer unions 100a, 100b are used to combine the two suppressant flows into one mixed gas flow. Each subsystem of the suppressant control module 90 further comprises respective pressure relief valves 99a, 99b. In addition to automated suppressant discharge, a manual discharge trigger 94 with on/off safety can be manipulated by the user of the personal computing device.

Returning to FIG. 7, the mixed gas flow exiting the mixer unions 100a, 100b follows various flow paths dictated by the shape of a gas flow manifold 102. The gas flow manifold 102 has respective branches that distribute the suppressant gas flow to the expansion bladders (e.g., expansion bladder 44a) and to the USB bridge 80. The USB bridge 80 routes suppressant flooding flow directly into the interior volume of the computer case 38 via conduits 80c and 80a and the USB plug 82a.

In general, the USB bridge assembly end fittings can be selected to meet the type and number of receptacles available. In the situation where the computing device has only one receptacle, the USB bridge assembly would be designed with concentric data transmission and suppressant flow paths.

Activation of the suppression flow control module 90 floods the volume at the interface between the battery-powered personal computing device and the fire detection and suppression system 16. This places a cold gas fire barrier at the interface.

In accordance with some embodiments, the suppression gas is a mixture of carbon dioxide and Halon 1301. Halon 1301 (CBrF) works by a combination of chemical and physical effects. The chemical effect, which is dominant is achieved by the atoms in the gas directly inhibiting combustion. Cold $CO_2$ gas is used to reduce the temperature of hot surfaces below the electrolyte vapor combustion temperature. Mixed $CO_2$ and Halon 1301 gas reduces the volume content of oxygen below the level necessary to support fire. The atoms in Halon 1301 gas chemically react directly with the flame chemistry to inhibit combustion. Mixing $CO_2$ and Halon 1301 has been shown to have a multiplier effect.

The physical effects of the suppressant gas mixture are temperature reduction and dilution. Temperature reduction occurs whenever a non-reactive gas is added to a flammable gas, because the heat liberated by the reaction of oxygen molecules with a fuel source must be distributed into the overall environment. The rate of the combustive chemical reaction decreases rapidly with reductions in temperature and, if the concentration of added inert gas is high enough, the flame chemistry fails altogether. Halon gas mixtures are not only inert but are low temperature when released from their pressurized state. Dilution is a simple matter of reducing the collision frequency of the oxygen and fuel source so that there is a reduction in chemical reaction rates. The magnitude of this effect, however, is relatively small compared to chemical inhibition and thermal effects, the former of these being the predominant one.

Several properties of carbon dioxide make it an attractive fire suppressant. It is not combustible and thus does not produce its own products of decomposition. Carbon dioxide provides its own discharge pressurization and leaves no residue. Carbon dioxide is relatively nonreactive with most other materials. It provides three-dimensional protection because it is a gas under ambient conditions. It is electrically nonconductive and can be used in the presence of energized electrical equipment.

Flame extinguishment by carbon dioxide is predominantly by a thermophysical mechanism in which reacting gases are prevented from achieving a temperature high enough to maintain the free radical population necessary for sustaining the flame chemistry. For inert gases presently used as fire suppression agents (argon, nitrogen, carbon dioxide, and mixtures of these), the extinguishing concentration is linearly related to the heat capacity of the agent-air mixture. Although of minor importance in accomplishing fire suppression, carbon dioxide also dilutes the concentration of the reacting species in the flame, which slows the rate of heat release.

Each of the embodiments described above provides a method for mitigating fire risk during operation of a battery-powered personal computing device onboard an aircraft. The method comprises: (a) placing a fire detection and suppression pack including a container containing suppressant onboard the aircraft; (b) establishing a closed physical connection between the container and the battery-powered personal computing device, which physical connection is configured to provide a flow path for fluid when a state of the physical connection is changed from closed to open; (c) monitoring a temperature inside the battery-powered personal computing device to determine whether a temperature inside the battery-powered personal computing device is above or below a specified threshold; and (d) opening the physical connection in response to a determination in step (c) that a temperature inside the battery-powered personal computing device is above the specified threshold. The method may involve forming jets of suppressant that impinge on a battery case of the personal computing device and/or directing suppressant through a receptacle and into a volume of space inside the case of the personal computing device.

The personal computing device may have a lithium-containing battery comprises a single lithium ion battery cell, a battery pack comprising a plurality of individual lithium ion battery cells housed inside of the battery pack, or a combination thereof.

While apparatus and methods for mitigating fire risk during operation of a battery-powered personal computing device onboard an aircraft have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "personal computing device" may include, but is not limited to, a laptop computer, a tablet computer, a computer notebook, a smartphone, a personal data assistant, or other hand-held computer.

The invention claimed is:

1. A fire detection and suppression pack comprising:
an open box-like dock case secured to a keyboard half of a battery-powered personal computing device and configured to support said keyboard half seated thereon with an interface volume therebetween such that said keyboard half is accessible to a user when a display half of said battery-powered personal computing device is raised and separated from said keyboard half;
a source of suppressant;
a suppressant regulation and distribution system connected to said source of suppressant; and
a control processor configured to issue an activation signal to said suppressant regulation and distribution system when a signal is received indicating that a temperature inside or outside the battery-powered personal computing device equals or exceeds a first limit set to indicate a fire event,
wherein said suppressant regulation and distribution system is configured to discharge and direct a flow of suppressant from said source of suppressant to said interface volume between the battery-powered personal computing device and the fire detection and suppression pack in response to receipt of said activation signal.

2. The fire detection and suppression pack as recited in claim 1, wherein said suppressant regulation and distribution system comprises a suppressant flow control module that is configured to discharge suppressant from said source of suppressant in response to receipt of said activation signal.

3. The fire detection and suppression pack as recited in claim 2, wherein said suppressant regulation and distribution system further comprises:
an expansion bladder having a port and a plurality of nozzles; and
tubing connecting said suppressant flow control module to said port of said expansion bladder,
wherein said nozzles are disposed in a portion of said expansion bladder that partly defines said interface volume.

4. The fire detection and suppression pack as recited in claim 1, wherein said suppressant comprises an inert gas.

5. The fire detection and suppression pack as recited in claim 1, wherein said suppressant comprises an organic halide gas.

6. The fire detection and suppression pack as recited in claim 1, wherein said control processor is further configured to issue an activation signal to said suppressant regulation and distribution system when a temperature inside or outside the battery-powered personal computing device equals or exceeds a second limit which is lower than the first limit and a rate of temperature increase equals or exceeds a third limit.

7. The fire detection and suppression pack as recited in claim 1, further comprising a flexible plastic sleeve draped over said keyboard half of said battery-powered personal computing device so that said keyboard half of said battery-powered personal computing device is secured to said open box-like dock case.

8. The fire detection and suppression pack as recited in claim 7, further comprising:
a bonded joint that attaches a first marginal portion of said flexible plastic sleeve to one side of said open box-like dock case;
a first strip of hook-and-loop fastener fabric attached to a second marginal portion of said flexible plastic sleeve; and
a second strip of hook-and-loop fastener fabric which is bonded to another side of said open box-like dock case,
wherein said first and second strips of hook-and-loop fastener fabric form a hook-and-loop fastener closure that allows for selective tensioning of said flexible plastic sleeve.

9. An assembly comprising a personal computing device and a fire detection and suppression pack comprising an open box-like dock case that supports said personal computing device, wherein said personal computing device comprises a keyboard half and a display half, said keyboard half comprising at least a battery and at least one temperature sensor, and wherein said open box-like dock case is secured to and configured to support said keyboard half seated thereon with an interface volume therebetween such that said keyboard half is accessible to a user when said display half is raised and separated from said keyboard half, wherein said fire detection and suppression pack further comprises:
a source of suppressant;
a control processor connected to receive electrical signals representing temperatures from said at least one temperature sensor and configured to issue an activation signal when a temperature inside the personal computing device equals or exceeds a first limit set to indicate a fire event; and
a suppressant regulation and distribution system connected to said source of suppressant, wherein said suppressant regulation and distribution system is configured to discharge suppressant from said source of suppressant and direct a flow of suppressant toward the personal computing device in response to receipt of said activation signal from said control processor, and wherein said suppressant regulation and distribution system comprises:
a suppressant flow control module that is configured to discharge suppressant from said source of suppressant in response to receipt of said activation signal;
an expansion bladder having a port and a plurality of nozzles facing said interface volume; and
tubing connecting said suppressant flow control module to said port of said expansion bladder,
wherein said expansion bladder is arranged so that suppressant flowing out through said plurality of nozzles and into said interface volume will impinge upon a case of said at least one battery or a portion of the case of the personal computing device which is adjacent to the at least one battery.

10. The assembly as recited in claim 9, wherein said fire detection and suppression pack further comprises a case having a first attachment device attached thereto and a flexible sleeve having one edge attached to said case and having a second attachment device attached to another edge thereof, said flexible sleeve being configured so that said second attachment device can be attached to said first attachment device when a portion of said personal computing device is disposed between said flexible sleeve and said case of said fire detection and suppression pack.

11. The assembly as recited in claim 9, wherein said source of suppressant comprises a first canister filled with an organic halide and a second canister filled with carbon dioxide.

12. An assembly comprising a personal computing device and a fire detection and suppression pack attached to said personal computing device, wherein said personal computing device comprises a case, at least one battery and at least one temperature sensor, and wherein said fire detection and suppression pack comprises:
 a source of suppressant;
 a control processor connected to receive electrical signals representing temperatures from said at least one temperature sensor and configured to issue an activation signal when a temperature inside the personal computing device equals or exceeds a first limit set to indicate a fire event, and
 a suppressant regulation and distribution system connected to said source of suppressant, wherein said suppressant regulation and distribution system is configured to discharge suppressant from said source of suppressant and direct a flow of suppressant toward the personal computing device in response to receipt of said activation signal from said control processor, and
 wherein said case of said personal computing device has an interior volume and a first port that is in fluid communication with said interior volume, and wherein said suppressant regulation and distribution system comprises tubing connecting said source of suppressant to said first port of said case to enable flow of suppressant from said source of suppressant into said interior volume of said case in response to said activation signal.

13. The assembly as recited in claim 12, wherein said control processor comprises a microprocessor, said suppressant regulation and distribution system comprises a switch, and said assembly further comprises an electrical cable connecting said microprocessor to said switch, at least a portion of said electrical cable being disposed inside a corresponding portion of said tubing.

14. The assembly as recited in claim 13, wherein said case has a second port, said assembly further comprising an electrical plug inserted in said second port, said electrical plug electrically coupling said microprocessor to one or more electrical conductors in said second port.

15. The assembly as recited in claim 14, wherein said first and second ports are respective USB receptacles.

16. The assembly as recited in claim 12, wherein said control processor is further configured to issue an activation signal to said suppressant regulation and distribution system when a temperature inside the battery-powered personal computing device equals or exceeds a second limit which is lower than the first limit and a rate of temperature increase equals or exceeds a third limit.

17. The fire detection and suppression pack as recited in claim 12, wherein said source of suppressant comprises a first canister filled with an organic halide and a second canister filled with carbon dioxide.

18. An assembly comprising a personal computing device and a fire detection and suppression pack comprising an open box-like dock case that supports said personal computing device, wherein said personal computing device comprises a keyboard half and a display half, said keyboard half comprising a battery and at least one temperature sensor, and wherein said open box-like dock case is secured to and configured to support said keyboard half seated thereon with an interface volume therebetween such that said keyboard half is accessible to a user when said display half is raised and separated from said keyboard half, wherein said fire detection and suppression pack further comprises:
 a source of suppressant;
 an electronic valve connected to said source of suppressant;
 an expansion bladder having a port and a plurality of nozzles facing said interface volume;
 tubing connecting said electronic valve to said port of said expansion bladder; and
 a control processor connected to receive electrical signals representing temperatures from said at least one temperature sensor and configured to issue an activation signal when a temperature inside the personal computing device equals or exceeds a first limit set to indicate a fire event,
 wherein said electronic valve opens to allow suppressant to flow from said source of suppressant into said expansion bladder and then into said interface volume in response to receipt of said activation signal from said control processor.

19. The assembly as recited in claim 18, wherein said battery comprises a case and said expansion bladder is arranged so that suppressant flowing out through said plurality of nozzles will impinge upon said case of said battery.

20. A method for mitigating fire risk during operation of a battery-powered personal computing device onboard an aircraft, comprising:
 (a) placing a fire detection and suppression pack including a container containing suppressant onboard the aircraft;
 (b) establishing a closed physical connection between the container and the battery-powered personal computing device, which physical connection is configured to provide a flow path for fluid when a state of the physical connection is changed from closed to open;
 (c) monitoring a temperature inside the battery-powered personal computing device to determine whether a temperature inside the battery-powered personal computing device is above or below a specified threshold;
 (d) opening the physical connection in response to a determination in step (c) that a temperature inside the battery-powered personal computing device is above the specified threshold; and
 (e) directing suppressant through a USB receptacle and into a volume of space inside the case of the personal computing device.

21. The method as recited in claim 20, further comprising forming jets of suppressant that impinge on a battery case of the personal computing device.

22. The method as recited in claim 20, wherein said suppressant comprises a mixture of an organic halide and carbon dioxide.

* * * * *